United States Patent [19]

Shaffer

[11] 3,798,384

[45] Mar. 19, 1974

[54] RING TRIP CIRCUIT

[75] Inventor: William E. Shaffer, Rochester, N.Y.

[73] Assignee: Stromberg-Carlson Corporation, Rochester, N.Y.

[22] Filed: Sept. 8, 1972

[21] Appl. No.: 287,390

[52] U.S. Cl. .............................................. 179/84 R
[51] Int. Cl. .............................................. H04m 3/02
[58] Field of Search ............ 179/84 R, 84 A, 18 HB

[56] References Cited

UNITED STATES PATENTS 3,730,799 5/1973 Shaffer .............................. 179/84 R

FOREIGN PATENTS OR APPLICATIONS 1,950,672 4/1971 Germany .......................... 179/84 A

*Primary Examiner*—William C. Cooper
*Attorney, Agent, or Firm*—Charles C. Krawczyk; William F. Porter, Jr.

[57] ABSTRACT

A ring trip circuit for telephone systems for supplying ringing signals and DC potentials to a called party and for detecting when a called party goes off hook. The ring trip circuit includes two unidirectional conducting paths, wherein each path conducts during opposite polarities of alternating current ringing signals. At least one of the unidirectional current paths includes a circuit for detecting when the called subscriber goes off hook.

9 Claims, 4 Drawing Figures

RING TRIP CIRCUIT

BACKGROUND OF THE INVENTION

This invention pertains to telephone ring trip circuits in general, and more particularly to circuits for transmitting ringing signals to telephone subscribers and for detecting when a called subscriber answers.

The increasing demand for more telephone services at lower cost results in subscribers adding more extensions to their presently existing lines. It is not uncommon for a subscriber to have as many as seven extensions on a single line. As a result of the additional extension telephones, subscribers have experienced premature tripping of the ringing signal. The ring trip circuit must be able to differentiate between alternating current (AC) ringing signals alone (occurring when the called party is being rung) and the combination of direct current (DC) and AC ringing current flow (occurring when the called party first goes off hook). The ring trip circuit must detect the off hook condition to cut off (trip) the ringing generator in the switching center or office. Premature ring trip occurs in the office as a result of the large current load on the ring trip circuit (such as a plurality of ringers on a single line), wherein the ring trip circuit falsely interprets the large ringing currents as an off hook indication. In premature ring trip, the ringing signal is removed and an attempt is made to complete the call before the called party answers. In such a condition the call is lost. Alternatively, when the called party answers in response to the ringing signal, the load on the circuit may be such that the ring trip circuit may fail to detect the off hook signal and the ringing signals may continue in the off hook condition producing undesirably loud ringing signals in the telephone receiver.

The ring trip circuit is required to operate properly under a large variety of loading conditions depending upon the particular connection established by the office. For example, the ring trip circuit must not trip during ringing under the high load connections (wherein the connected line has a very low loop resistance, a large number of ringers are connected to a single line, and the line exhibits high leakage) until the called party goes off hook. On the other hand, the same circuit is required to accurately detect off hook conditions with low load lines (wherein the connected telephone line exhibits low leakage, high loop resistance and includes only one ringer). In addition, the ring trip circuit is required to operate properly with nonlinear loading conditions such as those exhibited by the multiline key telephone sets having neon lights for indicating the calling lines. The neon lights produce a rectification effect that may cause more current to flow on different half cycles of the AC ringing signal producing a DC component that may be interpreted by the ring trip circuit as an off hook condition.

The ring trip circuits should also be useable in systems using superimposed ringers. Superimposed ringers have a gas tube in series therewith that breaks down with a preset polarity of DC potential applied across it to pass the AC ringing signal. The office selects the particular party to be rung by reversing the polarity of the battery in the office. Therefore a ring trip circuit in such an arrangement should be able to work with any polarity of office battery.

It is therefore an object of this invention to provide a new and improved ring trip circuit for telephone systems for providing alternating current ringing signals and direct current potential to a called subscriber and for detecting when the called subscriber goes off hook.

It is a further object of this invention to provide a new and improved ring trip circuit that can accurately detect an off hook condition under a wide variety of telephone loop loading conditions.

It is also an object of this invention to provide a new and improved ring trip circuit for telephone systems that includes reversal of office battery potential to provide selectivity in ringing parties on a multiparty line.

BRIEF DESCRIPTION OF THE INVENTION

A telephone ring trip circuit for connection in a series circuit with a telephone line, a ringing signal generator for applying AC ringing signals to a telephone line and a battery, wherein said ring trip circuit detects when a called party goes off hook in response to the ringing signals. A pair of unidirectional current conducting circuit means are connected between the input and the output terminals of the ring trip circuit and are poled for current flow in opposite directions. At least one of the unidirectional current conducting circuit means includes a capacitive circuit connected to be charged by ringing signal and direct current flow. The capacitive means is charged to a higher potential during both ringing signal and direct current flow (a condition when the called subscriber initially goes off hook) than with ringing signal current flow alone (prior to subscriber going off hook). Circuit means are provided, responsive to the higher potential, to operate a switching device to provide a trip signal to discontinue ringing. The ring trip circuit accurately detects off hook conditions under a wide variety of loading conditions and also in connections employing a variety of different types of ringers connected in multiparty connections.

In the event that the telephone system reverses battery polarity for a more selective ringing arrangement of multiparty line connections, each of the undirectional current conducting circuit means includes the capacitive charging means and circuit means responsive to the higher potential to provide the trip signal. The circuit that provides the trip signal depends upon the polarity of the battery used in ringing the called subscriber.

In accordance with a particular embodiment of the invention, at least one of the undirectional current conducting circuit means includes a pair of semiconductor devices, one of which discharges the capacitive means during alternate portions or half cycles of ringing signals, and the other being responsive to the higher potential to cause said switching means to actuate.

DESCRIPTION OF THE PREFERRED EMBODIMENT

Figure 4:
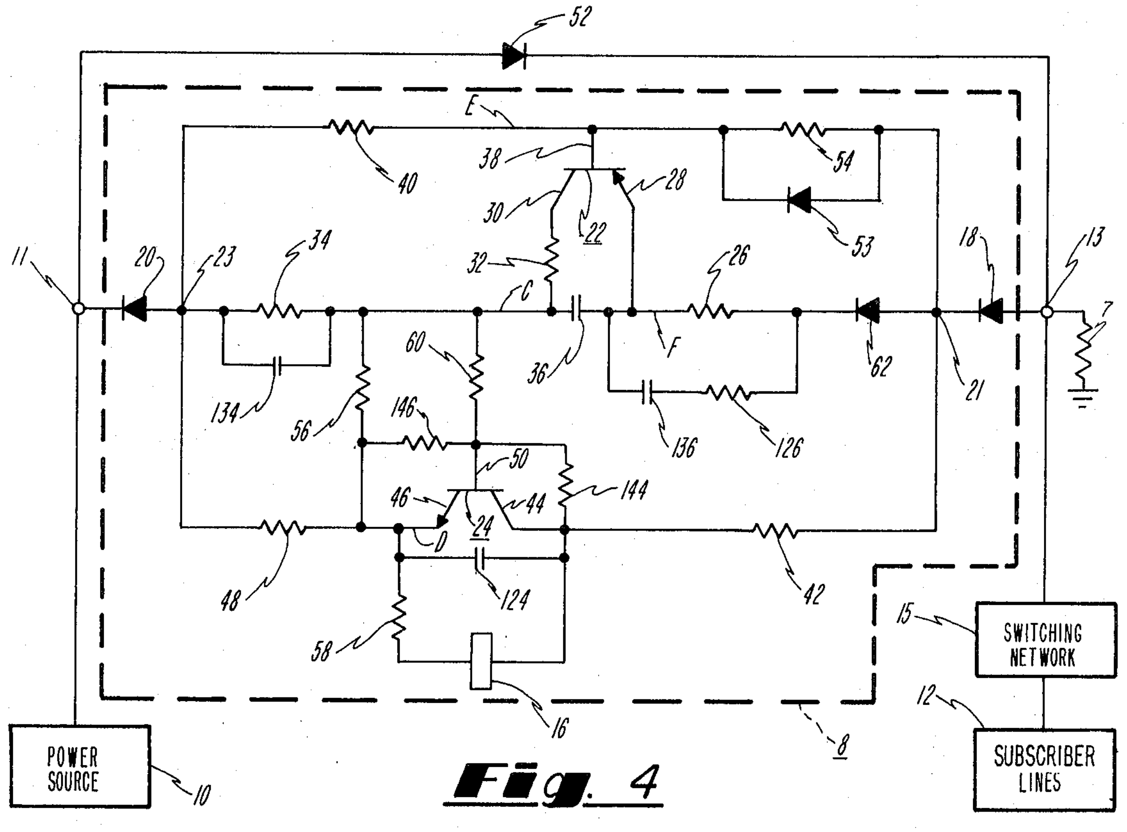
FIG. 4 is a schematic diagram of a fourth embodiment of the ring trip circuit of FIG. 1 in accordance with the teachings of this invention.

The ring trip circuit detects the off hook condition of a subscriber's telephone set 12 which occurs in answer to a ringing signal being applied to the set. The ring trip circuits embodying the invention are suitable for use with a plurality of different types of ringers such, for example, as straight line ringers, frequency selective ringers, common audible ringing devices, or superimposed ringers. Most often only one type of ringer is included in the telephone sets connected to a single telephone line. However, the ring trip circuits embodying the invention will also function properly when connected to a subscriber's telephone line having different types of ringers such, for example, as a superimposed ringer and a straight line ringer.

The circuit is connected to a telephone system power and ringing signal source 10, and via a switching network 15 to a plurality of subscriber telephone lines 12, each having at least one telephone set, which includes a ringer to be actuated by ringing signals applied thereto via the ring trip circuit. The power source 10 includes an AC ringing signal supply such, for example, as an alternator, and a DC power supply, such as a battery, connected in series so as to provide AC ringing signals superimposed on the DC potential. The ringer connected to the telephone set(s) of each of the subscriber telephone lines 12 may be of any particular type, but preferably should be of the same type.

The ring trip circuit comprises a first terminal 11 for connection to the power source 10 and a second terminal 13 for connection to the plurality of subscriber telephone lines 12 via the switching network 15. A resistor 7 is connected between the terminal 13 and ground. Two unidirectional current conduction circuits are connected between the terminals 11 and 13 and are in parallel with each other. The direction of current flow in each of the unidirectional circuits is opposite to each other circuit. The two unidirectional circuits provide a path for opposite cycles (or polarities) of the AC ringing signal. At least one of the unidirectional circuits, as determined by the DC polarity of the power source 10, is arranged as to detect the off hook condition of a telephone set which occurs when a called party answers in response to a ringing signal. Upon detecting the off hook condition, the unidirectional circuit operates a switching device which in turn activates associated circuitry (not shown) to stop the ringing signal from being applied to the answered telephone line.

Figure 1:
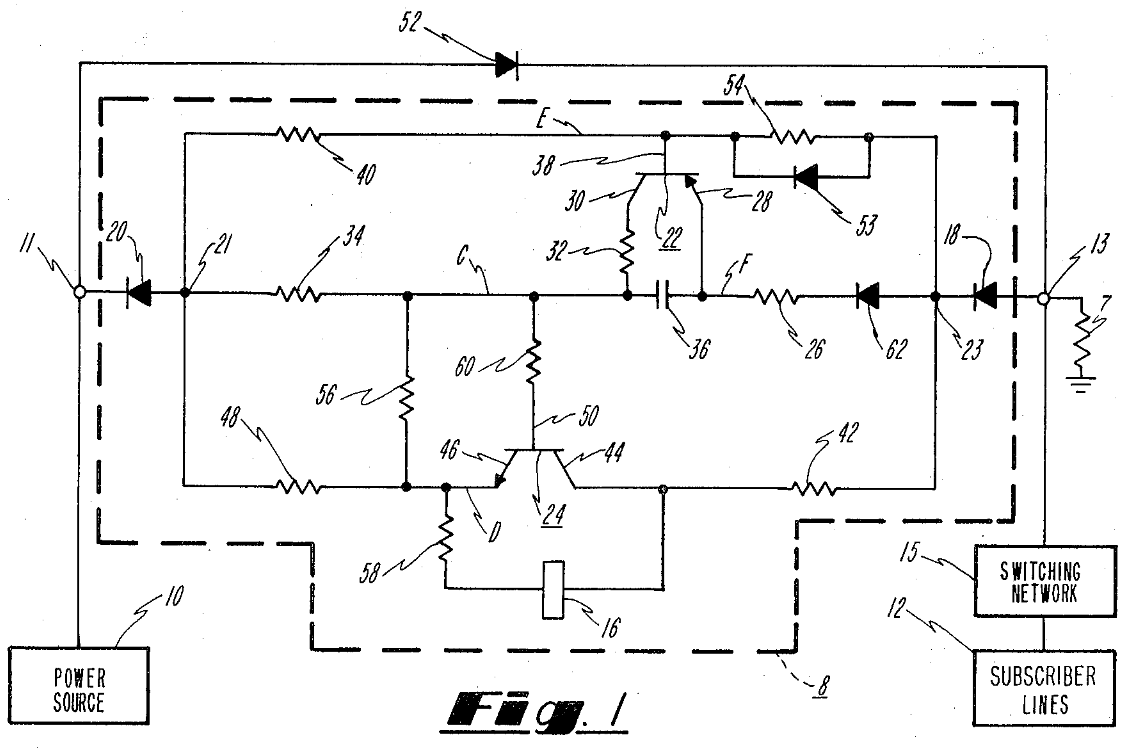
FIG. 1 is a schematic diagram of a first embodiment of a ring trip circuit in accordance with the teachings of this invention.

In the embodiment of FIG. 1, the first unidirectional circuit includes a diode 52. The second unidirectional circuit 8 includes at least one diode 18 connected at one end to the terminal 13. A second diode 20 is connected to the terminal 11, three series circuits having common terminals 21 and 23 are connected in parallel with each other between the diodes 18 and 20. If desired, one of the diodes 18 and 20 can be eliminated.

The first series circuit includes a first resistor 26, the emitter and collector leads, 28 and 30, respectively of a first transistor 22, a second resistor 34, and a diode 62. A capacitor 36 is connected across the emitter and collector leads, 28 and 30. The capacitor 36, along with the polarity of the potential across the terminals 11 and 13, controls the conductivity of the transistors 22 and 24. The resistors 26, 34, 48, 56 and the resistance of the telephone loop connection controls the charging rate of the capacitor 36. The second series circuit includes the third resistor 40 in series with the parallel combination of a diode 53 and a fourth resistor 54. The base 38 of the transistor 22 is connected to the junction E of the resistors 40 and 54. The third series circuit includes a fifth resistor 42, the collector and emitter leads 44 and 46, respectively of a second transistor 24 and a sixth resistor 48. A switching device 16 such, for example, as a relay is connected across the collector and emitter leads 44 and 46 respectively via a resistor 58. The base lead 50 of the second transistor 24 is connected via a resistor 60 to a junction C. A resistor 56 is connected between the junction C and a junction D.

Initially the capacitor 36 is fully discharged and the transistors 22 and 24 are cut off. During the ringing of a telephone set, alternating current flows through the unidirectional circuit 8 for one-half cycle of ringing signal wherein the total current flow through the unidirectional circuit 8 is divided into the three paths. The capacitor 36 is charged at a rate depending upon the peak magnitude of the half cycle of the ringing signal and the circuit R-C charge time constant which includes resistors 26, 34, 48, 56 the conduction of the transistor 48, and the resistance of the telephone loop to which the circuit is connected. While the capacitor is charging, the current flows such as to make the potential at junction C more positive than at junction D and hence the transistor 24 becomes conductive wherein current flows through the resistor 42, the collector and emitter leads 44 and 46, and the resistor 48. Some current flows through the relay 16, but is of an insufficient magnitude to cause the relay 16 to operate. The values of the components are selected so that during the R-C time constant of the circuit is such that the capacitor 36 is not allowed to be sufficiently charged to cut off the transistor 24 thereby keeping the relay 16 from operating. In addition, the potential at point C is more positive than the potential at point D and the transistor 22 remains cut off.

At the next half cycle, or change in polarity, of the ringing signal, the diodes 18 and 20 are reverse biased and the transistor 24 is turned off. The ringing signal for this half cycle flows through the first unidirectional circuit including the diode 52. Due to the charge on the capacitor 36 at this time, the potential at junction F becomes more positive than the potential at junction E and the transistor 22 becomes conductive to discharge the capacitor 36. During ringing and while the called party is on hook, the charge and discharge cycle of capacitor 36 is repeated and the relay 16 is not operated.

When the called subscriber goes off hook, whether it is during the ringing portion or the silent portion of the ringing signal, a path for a DC current flow is established through the second unidirectional circuit 8. The capacitor 36 now charges to the sum of the two applied potentials (AC and DC) which is a higher potential than was previously attainable during the on hook condition. As a result, the transistor 24 is rendered nonconductive and hence the current flow through the relay 16 is sufficient to operate the relay. The operated relay 16 activates the standard circuitry (not shown) which removes the ringing signal.

Hence, as can be seen, when the subscriber is in an on hook condition, the transistor 24 is conductive each half cycle of ringing signal and the capacitor 36 becomes charged each half cycle and discharged each subsequent half cycle. The charge accumulated on the capacitor 36 each half cycle is insufficient to cut off the transistor 24. When the subscriber goes off hook, a DC as well as an AC path is complete and the capacitor 36 is then charged to a higher potential thereby cutting off the transistor 24 and allowing the relay 16 to operate.

The resistor 7 allows biasing current flow through the relay 16 during ringing signals and silent periods therebetween. The biasing current flow is insufficient to operate the relay 16, but allows the relay 16 to respond more rapidly in the event of an off hook condition.

In some telephone exchanges the reversal of the potential of the DC power source (battery) is employed for selective ringing in multiparty lines. As a consequence, the ringers in the subscriber's telephone set connected to a single telephone line normally employ superimposed ringers. A superimposed ringer includes a gas tube in series therewith that breaks down with a preset polarity of potential applied thereto to pass ringing signals. The switching equipment of the central office to which the called subscriber telephone set, or sets, are connected deciphers the equipment number of the called subscriber and selects the proper polarity battery to be connected to that subscriber's telephone line.

Figure 2:
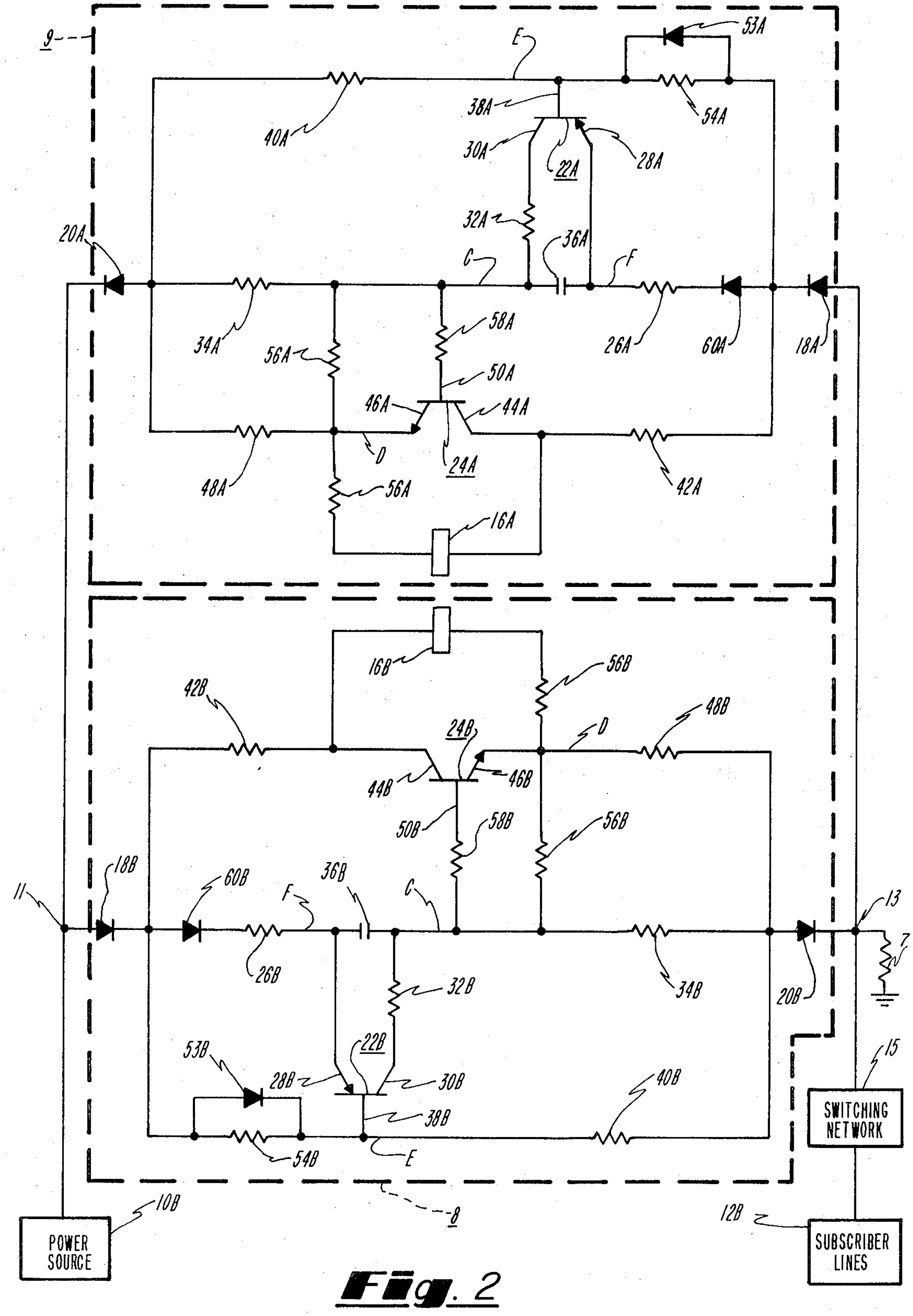
FIG. 2 is a schematic diagram of a second embodiment of a ring trip circuit in accordance with the teachings of this invention.

The ring trip circuit of FIG. 2 is suitable for use in a central office providing superimposed type ringing. The circuit of FIG. 2 is a modification of the ring trip circuit of FIG. 1 wherein the first unidirectional circuit (diode 52) has been replaced by a unidirectional circuit 9 similar to that of the second unidirectional circuit 8 however, connected for conduction for opposite polarity signals. The same elements in FIGS. 1 and 2 are identified by the same reference numerals, however, in FIG. 2 having a suffix A for the components in first unidirectional circuit 9 and a suffix B for the component in the second unidirectional circuit 8.

The first unidirectional circuit 9 (designated by the letter A) and the second unidirectional circuit 8 (designated by the letter B) operate essentially in the same manner as the second unilateral direction circuit 8 of FIG. 1. Depending upon the polarity of the AC ringing signal, one polarity of the ringing signal will be transmitted through the first unidirectional circuit 9 while the other polarity will be transmitted through the second unidirectional circuit 8 in a manner as previously described. Hence, as in FIG. 1, one half of each cycle of the ringing signal will be transmitted through separate unidirectional circuits. When the subscriber goes off hook during ringing, one of the unidirectional circuits will actuate its relay depending upon the polarity of DC DC power source used in ringing the called party.

Figure 3:
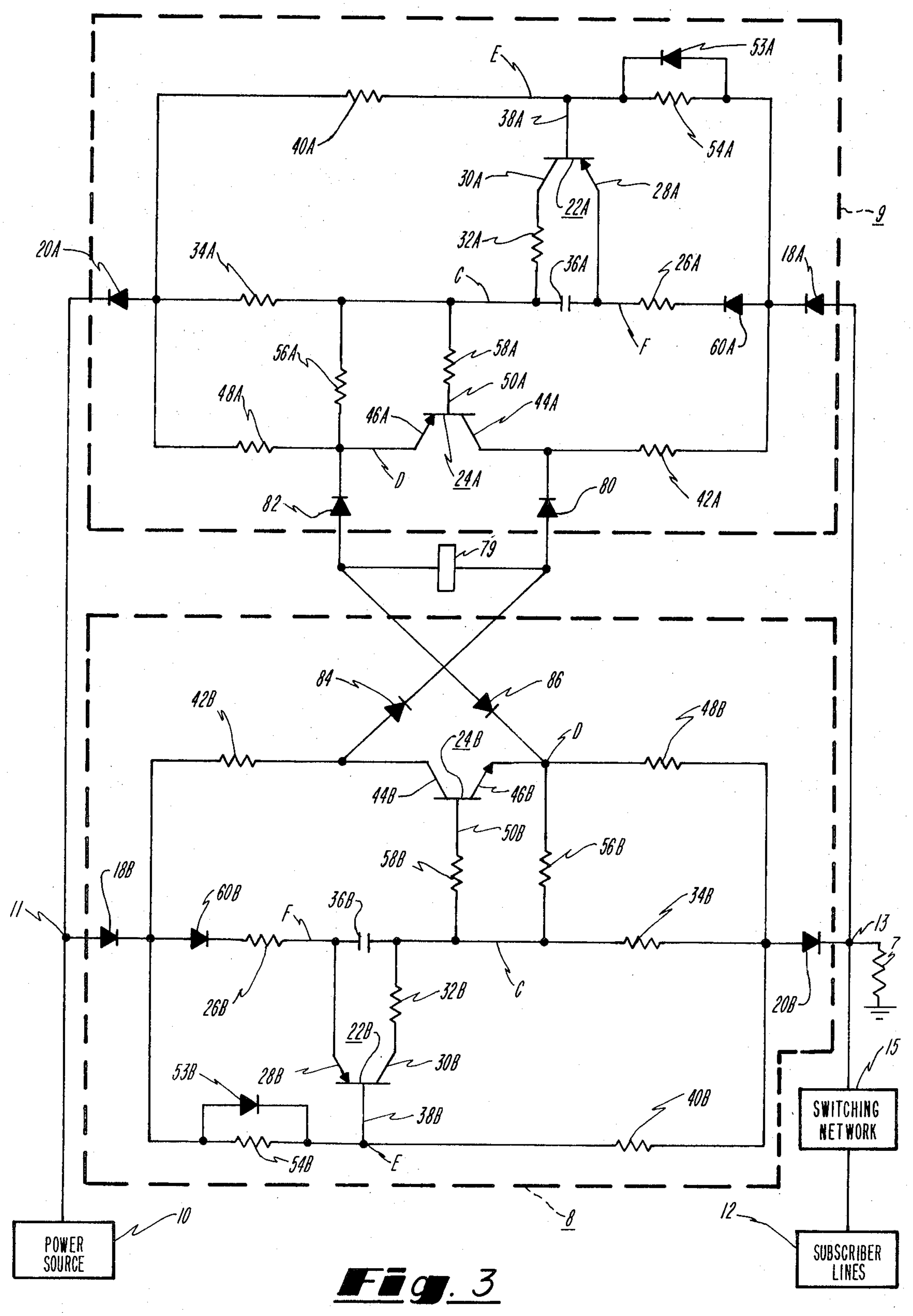
FIG. 3 is a schematic diagram of a third embodiment of a ring trip circuit in accordance with the teachings of this invention.

The ring trip circuit of FIG. 2 is modified in FIG. 3 to employ only one switching device or relay to activate the circuitry to stop the ringing of an answered subscriber's telephone set. The first unidirectional circuit 9 and the second unidirectional circuit 8 of FIG. 3 are the same as in FIG. 2 and therefore are identified by the same reference designations. The first and second unidirectional circuits of the circuit of FIG. 3 are interconnected by a bridging circuit to one relay 79. The bridging circuit includes four diodes 80, 82, 84 and 86. Either one of the first and second unidirectional circuits will still be able to detect the off hook condition of a subscriber answering to operate the relay 79 depending upon the polarity of the DC power supply.

Referring now to FIG. 4, the ring trip circuit of FIG. 1 is further modified to achieve a circuit that can handle greater ringer loading. A series circuit including a capacitor 136 and resistor 126 is connected in parallel with the resistor 26. A resistor 144 is connected between the base lead 50 and the collector lead 44 of the transistor 24. A resistor 146 is connected between the base lead 50 and the emitter 46 of the transistor 24. The capacitors 124 and 134 were added in shunt with the collector 44 and emitter 46 and with resistor 34, respectively.

A circuit was constructed having the configuration as shown in the Figures and was tested and the results evaluated. The description of the components employed in the circuits is as follows:

| | Item No. | |
|---|---|---|
| resistor | 7 | 15K ohms |
| do. | 26 | 1210 ohms |
| do. | 32 | 649 ohms |
| do. | 34 | 10K ohms |
| do. | 40 | 10K ohms |
| do. | 42 | 51 ohms |
| do. | 48 | 51 ohms |
| resistor | 54 | 100K ohms |
| do. | 56 | 150 ohms |
| do. | 58 | 51 ohms |
| do. | 60 | 100 ohms |
| do. | 126 | 10K ohms |
| do. | 144 | 110K ohms |
| do. | 146 | 1.5K ohms |
| capacitor | 36 | 16.5 MF |
| do. | 124 | 1.65 MF |
| do. | 134 | 5.6 MF |
| do. | 136 | 2 MF |
| transistors | 22 | MM4001 |
| do. | 24 | 2N3440 |
| all diodes | | 1N1694 |

The circuit of FIG. 1 was tested and evaluated under the following low and high load conditions with various numbers of ringers connected to the line:

1. low load condition
   ringers: one
   power source 10: battery: 36 volt DC ringing signal generator: 80 volt RMS 20 Hertz
   subscriber line 12: 1500 ohm loop impedance and high leakage resistance
2. high load condition
   ringers: ten
   power source 10: battery: 48 volt DC ringing signal generator; 90 volt RMS 20 Hertz
   subscriber line 12: zero loop resistance and 1500 ohm leakage resistance.

The circuit of FIG. 2 was tested and evaluated under the following high and low load conditions with various numbers of straight line and superimposed ringers connected to the line:

1. low load condition
   ringers: one
   power source 10: superimposed batteries: ± 36 volt DC ringing signal generator: 80 volt RMS 20 Hertz subscriber line 12: 1500 ohm loop impedance and high leakage resistance 2. high load condition
   ringers: seven
   power source 10: superimposed batteries: ±48 volt DC ringing signal generator: 90 volt RMS 20 Hertz
   subscriber line 12: zero loop resistance and 1500 ohm leakage resistance.

Under the above conditions, as few as one straight line or superimposed ringer and as many as ten straight line ringers, or seven superimposed ringers, were actuated by a ringing signal from the ringing generator without premature ring trip occurring. Upon any one of the telephone sets going off hook, the circuit detected the off hook condition and actuated the relay 16 to stop the application of the ringing signal to the ringers in the telephone sets. In addition, it was found that as many as 4 common audible devices and 10 neons could be actuated simultaneously with up to 10 straight line type ringers.

The value of the capacitor 36 is changed when the frequency of the ringing signal generated by the ringing generator is varied to the various standard ringing freuqencies employed by telephone operating companies such, for example, as 16-Q⅔ Hertz, 30 Hertz and the like. The circuit functioned well in that the ringers were actuated without the occurrence of premature ring trip under the various test conditions outlined previously. When a telephone set went off hook in responding to the applied ringing signal, the circuit detected the off hook condition and activated circuitry to stop the application of ringing signals to the telephone set(s).

What is claimed is:

1. A telephone ring trip circuit for connection in a series circuit with a telephone line, a ringing generator for applying AC ringing signals to the telephone line, and a battery, said ring trip circuit comprising:

an input terminal for connecting said ring trip circuit to said ringing generator and said battery;

an output terminal for connecting said ring trip circuit to said telephone line;

first unidirectional current conductive circuit means connected between said input and output terminals;

a second unidirectional current conductive circuit means connected between said input and output terminals poled for current flow in the opposite direction of said first unidirectional circuit means, said second unidirectional circuit means including capacitive means connected for charging by ringing signal and direct current flow wherein said capacitive means is charged to a higher potential with both ringing signal and direct current flow than with ringing signal current flow alone, and switching circuit means connected to said capacitive means and responsive to the higher potential across said capacitive means for providing an output signal for tripping the ringing generator.

2. A ring trip circuit as defined in claim 1 wherein:

said second unidirectional current conductive circuit means includes first and second semiconductor devices, resistive means, capacitive means connected in parallel with said first semiconductor device, and circuit means for connecting said first semiconductor device and said resistive and capacitive means between said input and output terminals so that with a first polarity of signal across said terminals said capacitive means is charged through said resistive means, and with the reverse polarity of signal across said terminals said capacitive means is discharged through said first semiconductor device, and wherein said switching circuit means includes a switching device and circuit means for connecting said second semiconductor device to said capacitive means, said second semiconductor device being responsive to said higher potential to actuate said switching device.

3. A telephone ring trip circuit for connection in a series circuit with a telephone line, a ringing signal generator for applying AC ringing signals to the telephone line and a battery, said ring trip circuit comprising:

an input terminal for connecting said ring trip circuit to said ringing generator and said battery;

an output terminal for connecting said ring trip circuit to said telephone line;

a switching device to provide a trip signal when actuated;

first and second unidirectional current conductive circuit means connected between said input and output terminals and poled for current flow in opposite directions, each of said first and second unidirectional current conductive circuit means including capacitive means connected for charging by ringing signal and direct current flow, wherein each said capacitive means is charged to a higher potential with both ringing signal and direct current flow than with ringing signal current flow alone, and circuit means connecting the capacitive means of said first and second unidirectional current conductive circuit means to said switching device so that said switching device is actuated in response to the higher potential across said capacitive means.

4. A ring trip circuit as defined in claim 1 wherein:

each of said first and second unidirectional conductive circuits includes first and second semiconductor devices, resistive means, capacitive means connected in parallel with said first semiconductor device, circuit means for connecting said first semiconductor device and said resistive and capacitive means between said input and output terminals so that with a first polarity of signal across said terminals said capacitive means is charged through said resistive means, and with the reverse polarity of signal across said terminals said capacitive means is discharged through said first semiconductor device, and circuit means for connecting said second semiconductor device so that its conduction is responsive to the charge on said capacitive means, and wherein said circuit means for connecting said first and second unidirectional current conductive circuit means to said switching device connects said second semiconductor device to actuate said switching device in response to said higher potential.

5. In a telephone system including a power source providing direct current potential and AC ringing signals, switching equipment, and a ring trip circuit for applying direct current and ringing signals to telephone lines via switching equipment, said ring trip circuit comprising:

a first terminal for connection to the switching equipment;

a second terminal for connection to said power source;

a first unidirectional current conductive circuit connected between said first and second terminals, and a second unidirectional current conductive circuit connected between said first and second terminals poled for current conduction in a direction opposite said first unidirectional current conductive circuit, said second unidirectional current conductive circuit including a resistance-capacitance charging circuit means for charging to a first potential level in response to ringing signal current flow and to a second potential level higher than said first potential level in response to both ringing signal current and direct current flow, and circuit means connected to said resistance-capacitance circuit means responsive to said second potential level to provide an output signal indicating an off-hook condition.

6. A ring trip circuit as defined in claim 5 wherein said unidirectional current conductive circuit includes:

first and second semiconductor devices;
resistive means;
capacitive means;
switching means;
circuit means for connecting a first one of said semiconductor devices and said resistive and capacitive means between said pair of terminals so that with a first polarity of signal across said terminals said capacitive means is charged through said resistive means, and with the reverse polarity of signal across said terminals said capacitive means is discharge through said first semiconductor device, and circuit means for connecting said second semiconductor device to said capacitive means so that said second semiconductor device is responsive to said second potential to actuate said switching means.

7. A ring trip circuit as defined in claim 5 wherein said first unidirectional current conductive circuit comprises a diode.

8. A ring trip circuit as defined in claim 6 wherein said first unidirectional current conductive circuit includes a diode, and wherein said circuit means connecting said first semiconductor device and said circuit means connecting said second semiconductor device includes a diode connected in series therewith.

9. A ring trip circuit as defined in claim 6 wherein said first unidirectional current conductive circuit includes a resistance-capacitance charging circuit means for charging to a first potential level in response to ringing signal current flow and to a second potential higher than said first potential in response to both ringing signal current and direct current flow, and circuit means connected to said resistance-capacitance circuit means responsive to said second potential to provide an output signal indicating an off hook condition.

* * * * *